C. E. AKELEY.
FILM BOX FOR MOTION PICTURE CAMERAS.
APPLICATION FILED APR. 27, 1916.
1,223,332.
Patented Apr. 17, 1917.
2 SHEETS—SHEET 2.
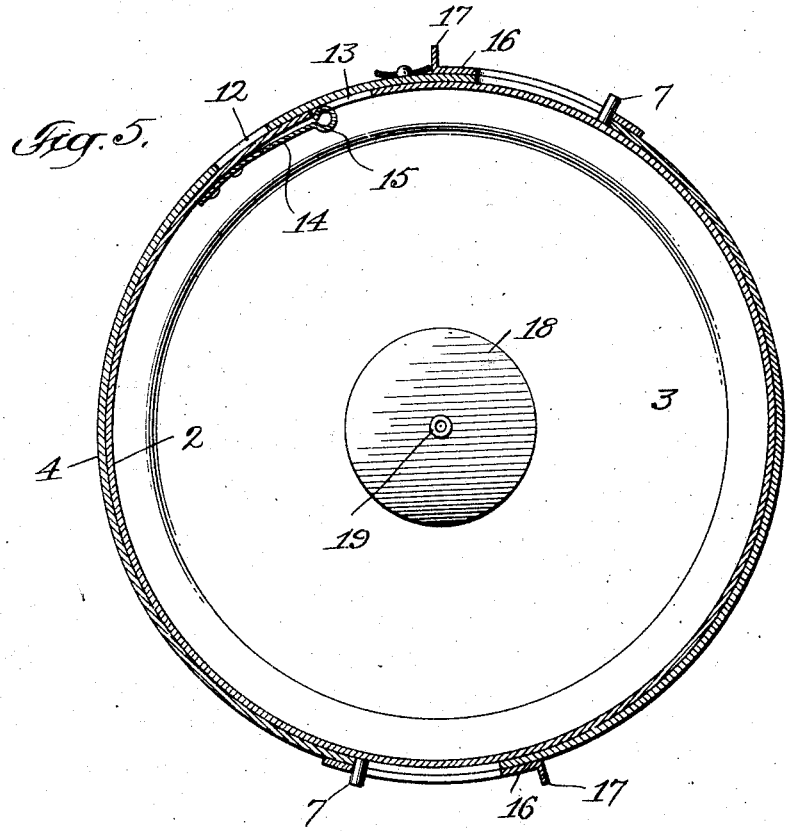
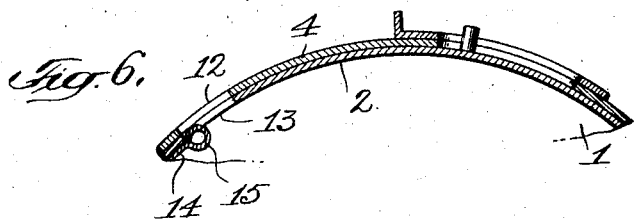
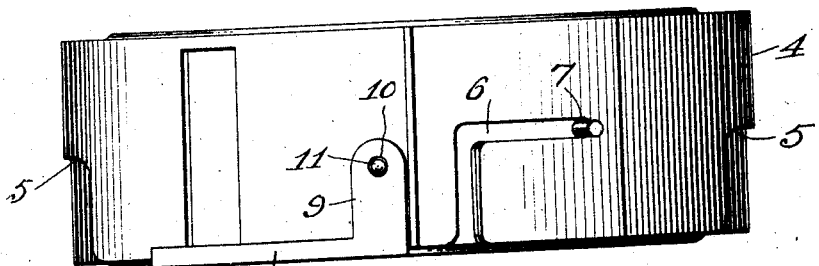
WITNESS:
INVENTOR
Carl E. Akeley
by Percy B. Hills
ATTORNEY

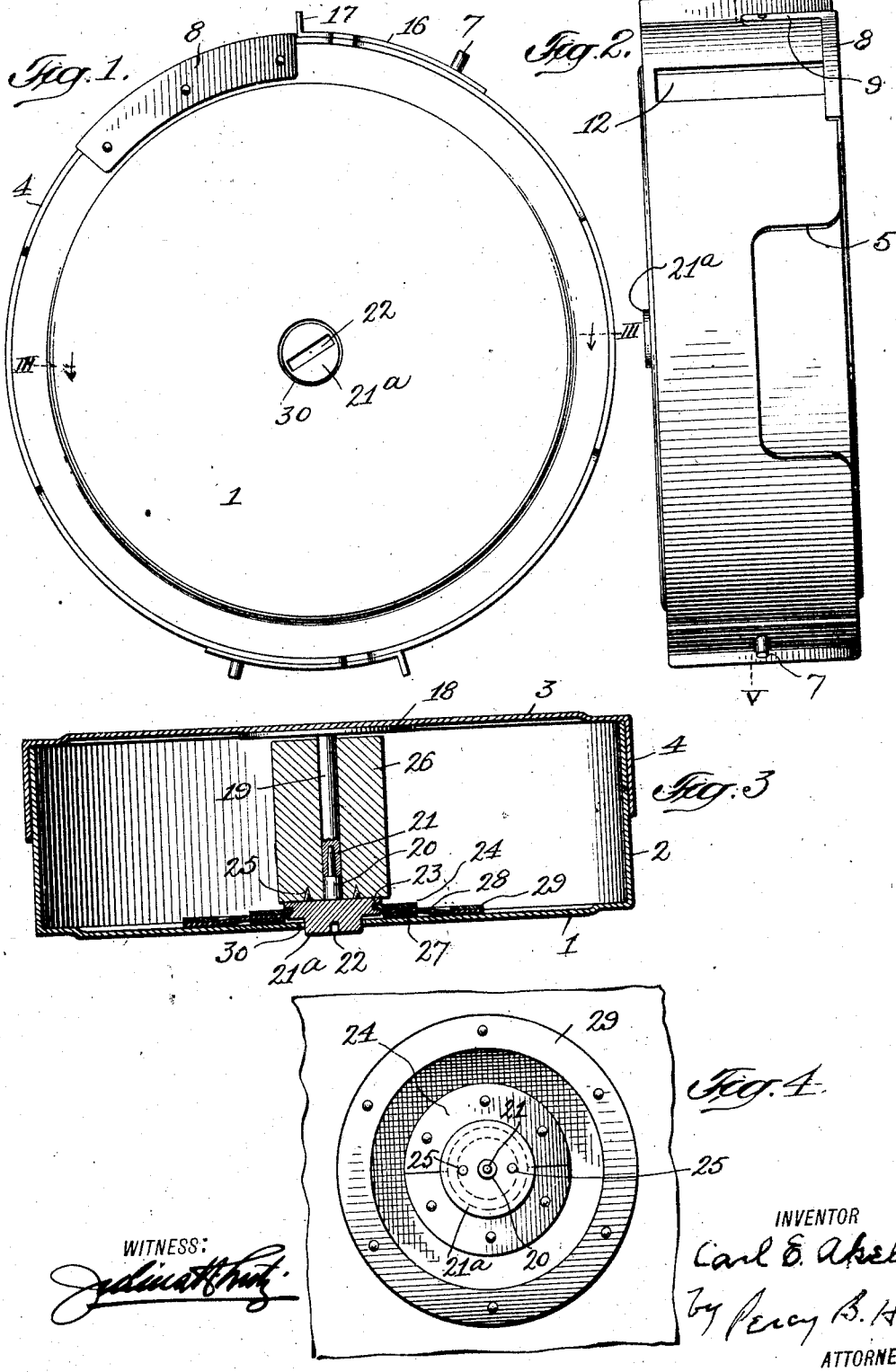

UNITED STATES PATENT OFFICE.

CARL E. AKELEY, OF NEW YORK, N. Y., ASSIGNOR TO AKELEY CAMERA, INC., OF NEW YORK, N. Y., A CORPORATION OF NEW YORK.

FILM-BOX FOR MOTION-PICTURE CAMERAS.

1,223,332.　　　　　　　　Specification of Letters Patent.　　　Patented Apr. 17, 1917.

Application filed April 27, 1916. Serial No. 93,928.

*To all whom it may concern:*

Be it known that I, CARL E. AKELEY, a citizen of the United States, residing at New York, in the borough of Manhattan, city of New York, and State of New York, have invented certain new and useful Improvements in Film-Boxes for Motion-Picture Cameras, of which the following is a specification.

My invention relates to film boxes for motion picture cameras, adapted conveniently to hold a reel of film prior to or subsequent to exposure, and is more particularly designed for use in conjunction with that type of motion picture camera, disclosed in Letters Patent No. 1,181,201, granted May 2, 1916, to Akeley Camera, Inc., as my assignee.

My improved film box is formed in two sections of substantially equal depth, one telescoping within the other, and adapted to be adjusted with respect to each other to open and close the film aperture, and embodies certain novel details of construction, both with respect to the rotation of the film spool and with respect to excluding light from the interior of the box when removed from the camera, as hereinafter will be more definitely pointed out and claimed, reference being had to the accompanying drawings, in which:—

Figure 1 is a side elevation of my improved box, the two sections thereof being shown in closed position with respect to each other.

Fig. 2 is an edge view of the same.

Fig. 3 is a sectional view of the same taken on the line III—III of Fig. 1.

Fig. 4 is a fragmentary view of the interior of one of the sections showing the means for sealing the opening through which the rotating element of the box passes.

Fig. 5 is a sectional view, taken on the line V—V of Fig. 2.

Fig. 6 is a detail sectional view of a portion of the telescoping rims of the two sections, showing said sections adjusted to position to permit the feed of the film therefrom or thereto.

Fig. 7 is a top plan view of the film box shown in its closed position.

Similar numerals of reference denote corresponding parts in the several views.

In the said drawings, the reference numeral 1 denotes one section of the film box provided with a rim 2, and 3 denotes the other section of the box provided with a rim 4 of substantially the same depth as the rim 2 of the section 1, said rim 4 being of a diameter to telescope over the rim 2. The rim 4 is recessed upon opposite sides at 5 to permit a grip on the rim 2 when the parts are in assembled position, whereby said section 1 and its rim 2 may be rotated with respect to the section 3 and rim 4. Said rim 4 is also provided with oppositely disposed angled slots 6, adapted to receive therein pins 7 fixed to the rim 2, said pins, through their coöperation with said slots, forming a bayonet joint connection for locking the two sections in their assembled telescoped position. Riveted to the section 1 is a plate 8 formed with a spring arm 9, which is apertured at its free end at 10 to engage over a stud 11 fixed to the rim 4, said stud being so positioned that this engagement will take place when the two sections are assembled and turned to their locked position, and thereby will retain the parts in said position against any but a positive displacement. The rim is slotted transversely at 12, said slot extending through the free edge of said rim, and the rim 2 is correspondingly slotted at 13, said slots being so located as to register with each other just before the pins 7 reach the transverse portions of the slots 6, which latter is the position wherein the sections may be separated, but are completely out of register when the sections are adjusted to the position shown in Fig. 7, thereby excluding all light at this point under said adjustment. Fixed to the inside of the rim 2 adjacent the slot 13 is a spring plate 14 having a rolled edge 15 lying against one edge of said slot, as best seen in Fig. 5. This rolled edge 15 is so positioned that it will abut against one edge of the slot 12 of the outer rim 4 when the two sections are rotated almost to their unlocked position, which is the position shown in Fig. 6, said rolled portion then being in proper position to permit the passage thereover of the film as it is fed to or from the box, thereby presenting a rounded surface which will prevent any scratching of the surface of the film. Riveted to the rim 4 and angularly slotted to correspond with the angular slots 6 in said rim are metal strengthening plates 16, preferably of brass, said plates having upturned edges 17 adapted to engage in suitable grooves formed in the interior of the camera to position the film box properly therein, said plates 16 also forming strengthening elements, of harder metal, the sections 1 and 3 and their rims preferably being formed of aluminum.

The section 3 has riveted centrally to its interior surface a circular plate 18, from which projects centrally a shaft 19, formed hollow for a portion of its length. Similarly mounted centrally in the section 1, as hereinafter described, is a stud 20 formed with a projecting pin 21 adapted to engage the aperture in the shaft 19 when the two sections are assembled, whereby the parts 19 and 20 will be connected and centered with respect to each other. The stud 20 is fixed to a nut 21ª slotted at 22 to receive a driving element in the camera and having its body portion slotted annularly at 23 to receive a split metallic collar 24, the inner surface of said nut 21ª being provided with spurs 25 adapted, when the parts are assembled, to penetrate and engage the wooden hub 26 upon which the film is mounted, said hub being removably disposed upon the shaft 19. Disposed between the split collar 24 and an inner metallic collar 27 is a disk of leather or other flexible material 28, which at its outer edge is fixed to the body 1 by means of a metal ring 29 suitably bolted to said section 1. This construction while it permits the free rotation of the nut 21ª, which projects through an aperture 30 in the body 1, at the same time effectually prevents ingress of any light whatever at this point.

In operation, when the box is to be used as a feed box for film, a spool 26 upon which the film is rolled is disposed upon the shaft 19, and the two sections of the box then brought together, the act of telescoping them causing the prongs 25 to penetrate the ends of the spool 26. When the two sections are telescoped so that the pins 7 register with the longitudinal portions of the slots 6, the parts may be rotated with respect to each other until the transverse slot 13 in the rim 2 passes out of register with the slot 12 in the rim 4, this position being shown in Fig. 5, and the box then is sealed most effectually against access of light at any point, and is locked against any but a positive displacement of parts by the engagement of the spring arm 9 on rim 2 with the stud 10 on rim 4. The box then may be inserted into a camera, and the sections rotated toward the open position until the relative position shown in Fig. 6 is reached, which does not quite bring the pins 7 in register with the transverse portions of the slots 6, but causes the slots 12 and 13 in the rims 2 and 4 to register with the rolled portion 15 of the spring 14 lying adjacent the edges of said slots on one side, and which acts as a guide for the film. With the parts in this position, the box is ready for feeding the film, which may be accomplished in any suitable manner, and may be accompanied by a rotation of the nut 21ª, thereby rotating the film spool 26. When the box is to be used as a receiver for exposed film, the two sections are separated and the film threaded through the aperture 12 and engaged with an empty spool 26 on the shaft 19. The section 1 is then telescoped into section 2, which causes the prongs 25 on nut 21ª to enter the spool 26, and said section 1 is then adjusted with respect to section 3 to the position of the rims 2 and 4, shown in Fig. 6, which brings the rolled portion 15 of the spring 14 in proper position to act as a guide for the film in its passage into the box. The nut 21ª, when the box is positioned properly in the camera, is engaged as to its slot 22 by a suitable projection on the operative parts of the camera, whereby the said nut and consequently the spool 26 are rotated to wind the film upon said spool as it is fed through the machine. When the film is exhausted, the members of the box are adjusted to the closed position shown in Fig. 5, when the box and its contained film may be removed and carried to the dark room to fix the same.

A further and important function of the spring plate 14 and its rolled edge 15 is found in the fact that when the sections are rotated to the position shown in Fig. 5, said rolled edge 15 is forced against the inner face of the rim 4, thereby forming a light-proof joint at that point, and effectually preventing the admission of light.

Having thus described my invention, what I claim as new and desire to secure by Letters Patent, is:—

1. A film box, comprising two sections having rims of substantially equal depth adapted to telescope one within the other, said rims being slotted transversely and said slots adapted to be brought into or out of register upon an adjustment of said sections with respect to each other while in their telescoped position, and means for locking said rims against separation but permitting relative rotation of said sections.

2. A film box, comprising two sections having rims of substantially equal depth adapted to telescope one within the other, said rims being slotted transversely and said slots adapted to be brought into or out of register upon an adjustment of said sections with respect to each other while in their telescoped position, means for locking said rims against separation but permitting relative rotation of said sections, and means for locking said rims against accidental relative rotation when the sections are adjusted to bring the transverse slots in the rims thereof out of register with each other.

3. A film box, comprising two sections having rims of substantially equal depth adapted to telescope one within the other, said rims being slotted transversely and said slots adapted to be brought into or out of register upon an adjustment of said sections with respect to each other while in their telescoped position, a bayonet joint for connecting said rims comprising an angular slot in one rim and a pin in the other rim for engaging said slot, and a spring member on one rim adapted to engage a stud on the other rim when the sections are adjusted to bring the transverse slots in the rims thereof out of register with each other.

4. A film box, comprising two sections having rims of substantially equal depth adapted to telescope one within the other, said rims being slotted transversely and said slots adapted to be brought into or out of register upon an adjustment of said sections with respect to each other while in their telescoped position, and a spring plate carried by one of said rims and disposed so that its free end lies at one edge of the inner transverse slot, whereby it may act as a film guide when the box is adjusted to feeding position and as a light excluder when the box is adjusted to closed position.

5. A film box, comprising two sections having rims of substantially equal depth adapted to telescope one within the other, said rims being slotted transversely and said slots adapted to be brought into or out of register upon an adjustment of said sections with respect to each other while in their telescoped position, and a spring plate carried by one of said rims and disposed so that its free end lies at one edge of the inner transverse slot, said free end being rolled and acting as a film guide when the box is adjusted to feeding position and as a light excluder when the box is adjusted to closed position.

6. A film box, comprising two sections adapted to telescope one within the other, an apertured shaft fixed to one of said sections, a rotatable nut fixed centrally in the other section, a pin fixed to said nut and adapted to engage the aperture in said shaft when the sections are assembled, and spurs on the inner face of said nut adapted to engage and penetrate a film spool mounted on said shaft when the sections are centered.

7. A film box, comprising two sections adapted to telescope one within the other, a shaft fixed centrally on one section, a grooved nut rotatably mounted in the other section and having a pin adapted to register with said shaft, a split collar disposed in the groove in said nut, a flexible disk located on the interior of said member to which said split collar is fixed, and means for fastening the outer edge of said flexible disk to the interior of said member.

In testimony whereof, I hereunto set my hand this 26th day of April, 1916.

CARL E. AKELEY.